C. RUHE.

MACHINE FOR BRUSHING SOLE LEATHER.

APPLICATION FILED JULY 6, 1915.

Reissued Sept. 21, 1915.

13,984.

3 SHEETS—SHEET 1.

Witnesses

Inventor

Carleton Ruhe,

By C. L. Parker.

Attorney

C. RUHE.

MACHINE FOR BRUSHING SOLE LEATHER.

APPLICATION FILED JULY 6, 1915.

Reissued Sept. 21, 1915.

13,984.

3 SHEETS—SHEET 2.

Witnesses

M. Lyles

B. Whitehurst

Inventor

Carleton Ruhe.

By

C. L. Parker

Attorney

COLUMBIA PLANOGRAPH CO., WASHINGTON, D. C.

C. RUHE.

MACHINE FOR BRUSHING SOLE LEATHER.

APPLICATION FILED JULY 6, 1915.

Reissued Sept. 21, 1915.

13,984.

3 SHEETS—SHEET 3.

Witnesses

M. Lyles

B. Mrkhume

Inventor

Carleton Ruhe,

By C. L. Parker.

Attorney

COLUMBIA PLANOGRAPH CO., WASHINGTON, D. C.

UNITED STATES PATENT OFFICE.

CARLETON RUHE, OF OLEAN, NEW YORK.

MACHINE FOR BRUSHING SOLE-LEATHER.

Specification of Reissued Letters Patent. Reissued Sept. 21, 1915.

13,984.

Original No. 1,112,163, dated September 29, 1914, Serial No. 831,522. Application for reissue filed July 6, 1915. Serial No. 38,376.

*To all whom it may concern:*

Be it known that I, CARLETON RUHE, a citizen of the United States, residing at Olean, in the county of Cattaraugus and State of New York, did invent certain new and useful Improvements in Machines for Brushing Sole-Leather; and it is hereby declared that the following is a full, clear, and exact description of the invention, such as will enable others skilled in the art to which it appertains to make and use the same.

My invention relates to a machine for brushing sole-leather.

An important object of the invention is to provide a machine of the above mentioned character, so constructed that the supporting bed or plate-support thereof may be accurately adjusted to exert the proper pressure upon the sole-leather or the like passing longitudinally of the same, to hold the leather in engagement with the rotatable brushes.

A further object of the invention is to provide means whereby the sole-leather or the like is fed longitudinally of the bed or plate-support by certain of the brushes, which also coöperate with another brush or brushes to thoroughly brush or treat the leather.

A further object of the invention is to provide means of the above mentioned character, which is simple in construction, inexpensive to manufacture, convenient in use, strong and durable.

Other objects and advantages of the invention will be apparent during the course of the following description.

Figure 1:
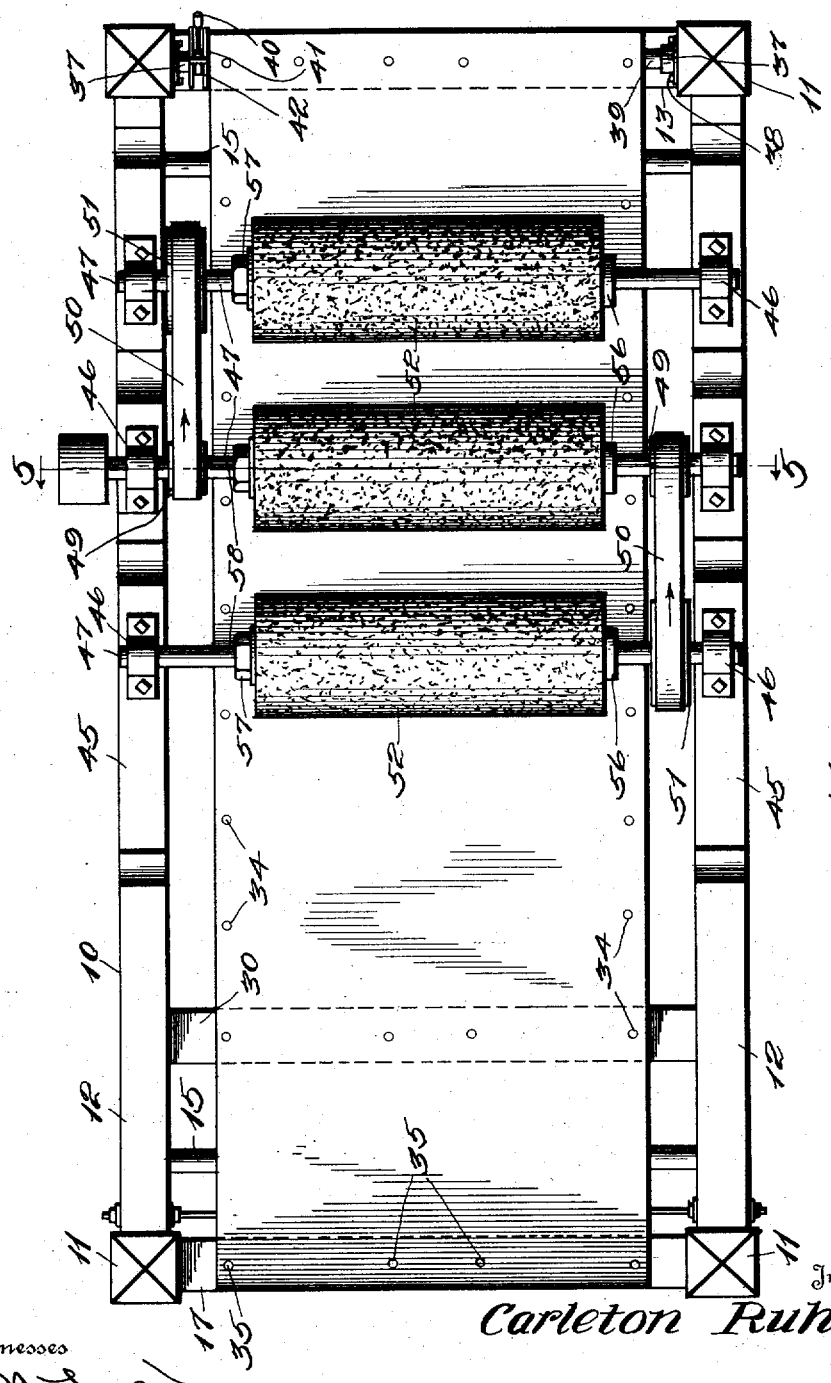
Figures 2, 3:
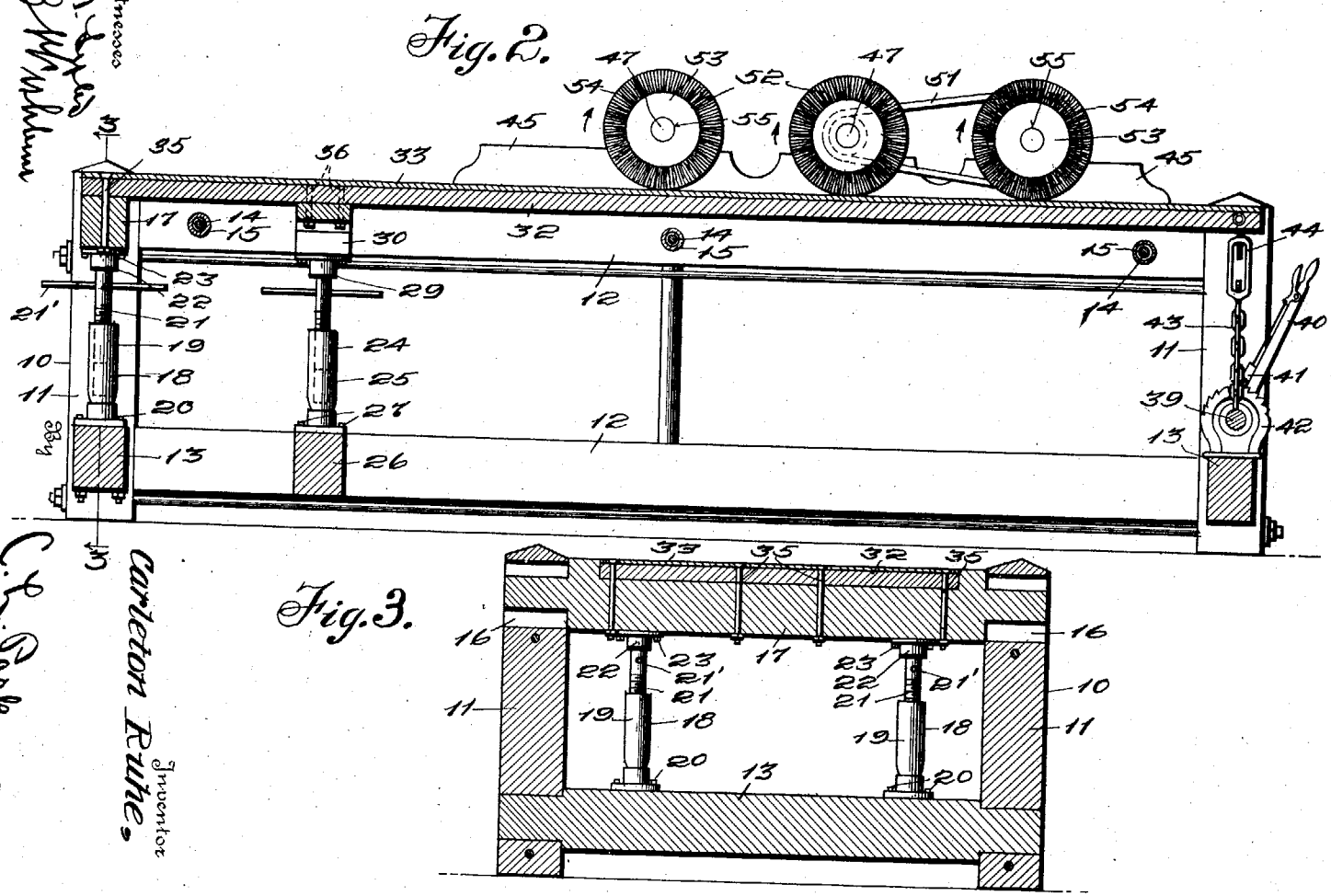
Figure 4:
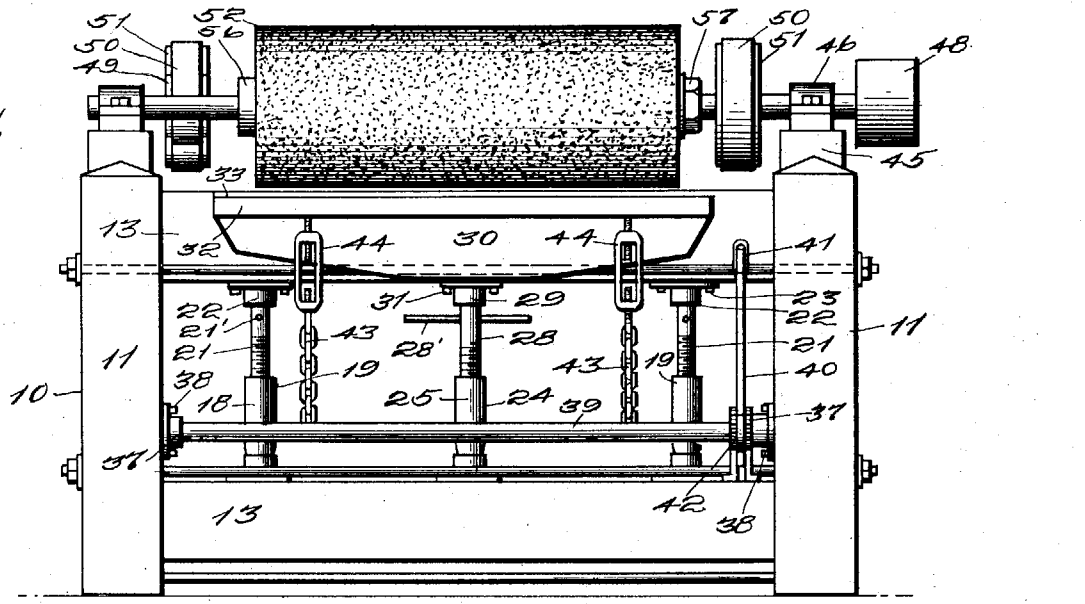
Figure 5:
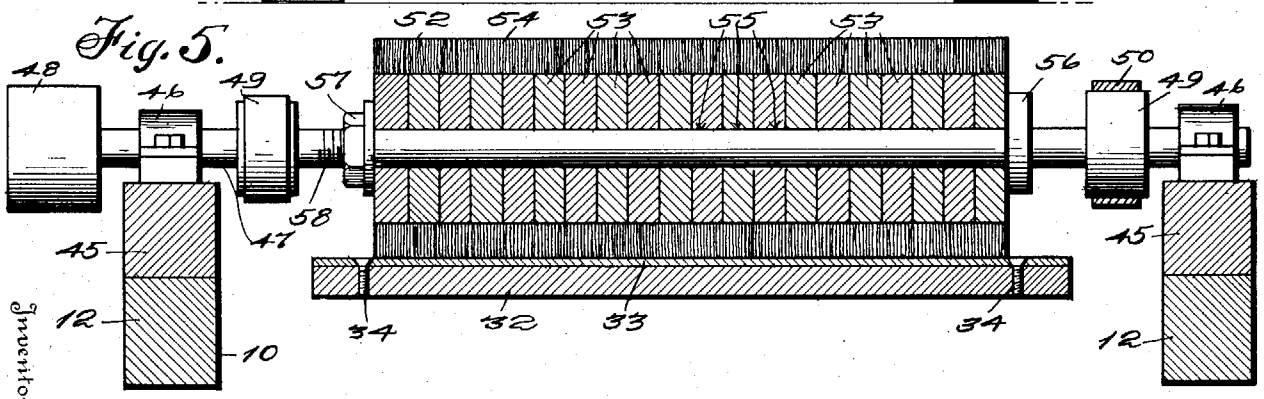

In the accompanying drawings forming a part of this specification and in which like numerals are employed to designate like parts throughout the same, Figure 1 is a plan view of a machine embodying my invention, Fig. 2 is a central longitudinal sectional view through the same, Fig. 3 is a transverse sectional view taken on line 3—3 of Fig. 2, Fig. 4 is an end elevation of the machine, and, Fig. 5 is a central longitudinal sectional view through one of the rotatable brushes.

In the drawings, wherein for the purpose of illustration is shown a preferred embodiment of my invention, the numeral 10 designates a main relatively stationary outer frame or support, embodying upstanding posts 11, connected by longitudinal and transverse horizontal beams 12 and 13, rigidly secured thereto, in any suitable manner. This main outer frame may be braced or otherwise strengthened by means of tie rods 14, preferably extending through tubes or pipes 15, as shown. The main outer frame may be made in various ways, it being sufficient that a suitably strong and rigid structure is provided.

The posts 11 in one transverse pair thereof (see more particularly Fig. 3), are provided upon their inner sides and near their upper ends with vertical openings 16, receiving the outer ends of a transverse horizontal vertically adjustable supporting member or beam 17. Longitudinally extensible means 18 are provided to positively raise and lower this vertically movable member or beam, the same being preferably in the embodiment of jacks, each of which includes a tubular portion 19, rigidly mounted upon the adjacent transverse beam 13 and secured thereto by bolts 20 or the like. Each jack further comprises a screw-threaded rotatable standard 21, operating within and having screw-threaded engagement with the tubular portion 19, the same having a head 22 swiveled upon the upper end thereof, such head being rigidly secured to the vertically movable member or beam 16 by means of bolts 23. The standards 21 are turned by levers or rods 21′, passing through transverse openings formed therethrough.

Arranged suitably near and in advance of the longitudinally extensible means 18, is longitudinal extensible means 24, embodying an internally screw-threaded tubular portion 25, the lower end of which is rigidly mounted upon a transverse beam 26, arranged between and secured to the longitudinal beams 12, and attached thereto by means of bolts 27 or the like, as shown. This longitudinally extensible means further comprises a screw-threaded standard 28, extending into the screw-threaded tubular body portion 24, such standard having a swiveled head 29 secured to the upper end thereof. This swiveled head 29 is secured to a transverse support or bolster 30 (see also Fig. 4), by means of bolts 31. It is obvious that the support or bolster 30 may be raised and lowered by rotating the standard 28, which is effected by the means of a transverse lever or rod 28′, passing through a transverse aperture thereof.

The numeral 32 designates a flat bed or plate-support preferably formed of ash-wood, of suitable thickness, although other material may be advantageously employed. This bed or plate-support is covered with a section of sheet metal 33 secured thereto by bolts 34 or the like, for providing a suitably smooth surface to engage the leather. This bed or plate-support is suitably stiff and resilient. As more clearly shown in Fig. 2, one end of this bed or plate-support is mounted upon the vertically movable support or beam 17 and is secured thereto by means of bolts 35 or the like. (See also Fig. 1). The vertically movable member or bolster 30 engages the lower surface of the bed or plate-support 32, at a point spaced a substantial distance from the support or beam 17, and is secured thereto by means of bolts 36, the heads of which are preferably arranged below the sheet metal covering 33, as shown. It is thus seen that the bed or plate-support 32 may be raised and lowered, by proper manipulation of the longitudinally extensible means 18 and 24, whereby the same will move the sole-leather or the like into proper engagement with rotatable brushes, as will be more fully explained.

Arranged near and above the other transverse beam 13 are bearings 37 (see Fig. 4), rigidly secured to the adjacent posts 11 by means of bolts 38 or the like. Journaled within these brackets or bearings, is a horizontal rock-shaft 39, to which is rigidly connected a manually operated lever 40, to turn the same. This lever is provided with the usual latch means 41 to engage with a stationary ratchet-teeth quadrant 42, to lock the lever against upward swinging movement. Connected with the shaft 39 are flexible elements, preferably chains 43, which are in turn connected with the free end of the bed or plate-support 32 by adjustable means, preferably in the embodiment of turn-buckles 44, as more clearly illustrated in Figs. 2 and 4. The function of this lever and associated elements is to swing the bed or plate-support 32 downwardly, to move the same entirely out of engagement with the rotatable brushes, as will be more fully explained.

Mounted upon the upper longitudinal beams 12, are support-beams 45, rigidly secured to the beams 12 by any suitable means. Upon these support-beams are mounted bearings 46, through which are journaled transverse rotatable shafts 47, extending above the bed or plate-support 32, as shown. These shafts 47, which are preferably three in number, are equidistantly spaced, as shown. The intermediate shaft 47 is the driving shaft, and has a pulley 48 rigidly mounted upon one end thereof, to receive rotation from any suitable source of power. In the operation of the machine, this shaft is preferably driven at a speed of one thousand revolutions a minute. Rigidly mounted upon the opposite end portions of the intermediate shaft 47 and inwardly of the bearing 46 are smaller pulleys 49, engaged by belts 50, extending in opposite directions to engage larger pulleys 51, which are rigidly mounted upon the outer transverse shafts 47. The outer transverse shafts 47 are geared to the inner transverse shaft 47 to be rotated thereby at one-half speed with respect thereto.

Mounted upon each of the shafts 47, for rotation therewith, are cylindrical brushes, designated as a whole by the numeral 52, (see more particularly Fig. 5). Each of these brushes is formed of a plurality of brush wheels 53, preferably twenty in number, each brush wheel being preferably two inches wide and fourteen inches in diameter, although these dimensions may be widely varied. The brush wheels carry upon their peripheries brush portions 54, as shown. The brush wheels are centrally apertured, as shown at 55, for receiving the shaft 47, the outermost brush wheel at one end engaging a stop-collar 56, rigidly secured to the shaft by any suitable means. The outermost brush wheel at the opposite end is engaged by a clamping nut 57 mounted upon a screw-threaded portion 58 of the shaft 47. It is obvious that stop-collar 56 and the clamping nut 57 will serve to lock or clamp the brush wheels to the shaft 47 for rotation therewith. The operation of the machine is as follows:

The intermediate brush 52 is preferably driven in the direction indicated by the arrow at approximately one thousand revolutions per minute, more or less, while the outer brushes 52 are rotated in the same direction at approximately one-half of such speed, namely five hundred revolutions per minute, more or less. The two outer brushes act as feed-rolls, thus prohibiting the leather or the like from being fed too rapidly by the inner brush, and at the same time serving to brush the leather. These outer brushes when rotating, as above stated, cause the leather to travel longitudinally sufficiently rapidly so that its upper surface will not burnish. As the leather travels longitudinally upon the bed or plate-support, which is suitably stiff and resilient, in engagement with the rotating brushes, such bed will automatically yield or move slightly in a vertical plane, up or down, to allow of the proper passage of the leather under and in engagement with the rotating brushes, and to compensate for all irregularities in the thickness of the leather.

The pressure that the rotating brushes exert upon the leather when passing therebeneath, may be regulated by adjusting the extensible means 19 or the extensible means 24 or both, the chains or flexible elements 43 being rendered slack to permit of the proper yielding of the bed in opposite directions. To entirely remove the pressure between the brushes and leather, the lever 40 is swung downwardly, turning rock-shaft 39, which in turn draws the flexible elements 43 downwardly. These flexible elements move the free end of the bed or plate-support 32 downwardly, the same bending longitudinally, by virtue of the fact that its opposite end is held stationary and the same is constructed suitably resilient, as before stated. From the foregoing, it is obvious that I have provided a suitably resilient or yielding bed or plate-support, which is self-adjusting within limits during the operation of the machine, and which may be manually adjusted to change the pressure between the brushes and leather, and moved away from the brushes sufficiently to entirely relieve the pressure between the brushes and the leather or to move the leather entirely out of engagement with the brushes. The bed may also be bent longitudinally, by setting the holding means at the opposite end thereof, and extending the means 24, which is found advantageous under some circumstances.

It is to be understood that the form of my invention herewith shown and described is to be taken as a preferred example of the same and that various changes in the shape, size, and arrangement of parts may be resorted to without departing from the spirit of the invention or the scope of the subjoined claims.

Having thus described the invention, I claim:—

1. In a machine of the character described, a supporting structure, a support connected therewith to receive the leather thereon, an intermediate rotatable brush arranged above and near the support to engage with the leather thereon, outer rotatable brushes arranged above and near the support upon opposite sides of the intermediate brush to engage with the leather, and means to rotate all of the brushes in the same direction and the intermediate brush at a greater rate of speed than the outer brushes.

2. In a machine of the character described, a supporting structure, a support connected therewith and adapted to receive the leather thereon, an intermediate rotatable brush arranged above and near the support to engage with the leather, outer rotatable brushes arranged above and near the support to engage the leather, means to rotate the intermediate brush, and speed reducing gearing between the intermediate brush and the outer brushes to drive the outer brushes in the same direction with the intermediate brush and at a less rate of speed.

3. In a machine of the character described, a supporting structure, a resilient bed arranged near the supporting structure, means connecting one end portion of the resilient bed with the supporting structure, so that the opposite end portion thereof is free to be swung in a vertical plane, a roll connected with the supporting structure and arranged near and below the vertically movable end portion of the resilient bed, a flexible element connected with the vertically movable end portion of the resilient bed and with the roll to be wound thereon, means to turn the roll and hold the same in a desired position against movement, a rotatable brush arranged near and above the resilient bed to engage with material traveling thereon, and means to rotate the brush.

4. In a machine of the character described, a supporting structure, a resilient bed arranged near the same, vertically adjustable means connecting one end of the bed with the corresponding end of the supporting structure, a second vertically adjustable means arranged near and spaced a substantial distance from the first named vertically adjustable means, and connecting the bed and the supporting structure, a drum connected with the supporting structure, and arranged near and below the opposite end of the resilient bed, a flexible element connected with this end of the resilient bed, and with the drum to be wound upon the drum, means to turn the drum and hold the same in a desired position, a rotatable brush arranged near and above the resilient bed to engage material traveling thereon, and means to rotate the brush.

5. In a machine of the character described, a resilient bed adapted to be approximately horizontally arranged vertically, adjustable means connected with the opposite ends of the resilient bed to hold the same against upward movement, adjustable means engaging the resilient bed between its ends to move the same upwardly and positively hold that portion of the bed with which the same engages against vertical movement, a rotatable brush arranged above and near the resilient bed, and means to drive the brush.

In testimony whereof I affix my signature in presence of two witnesses.

CARLETON RUHE.

Witnesses:
NERA JESSOP,
HENRY FORD.

Copies of this patent may be obtained for five cents each, by addressing the "Commissioner of Patents, Washington, D. C."